United States Patent [19]

Meyer et al.

[11] 4,235,602
[45] Nov. 25, 1980

[54] INSTALLATION FOR MIXING AND SEPARATING TWO NON-MISCIBLE LIQUIDS, INTER ALIA FOR LIQUID-LIQUID EXTRACTION

[75] Inventors: Maurice Meyer, Chaville; Heinrich Stucki, Neuilly-sur-Seine, both of France

[73] Assignee: Krebs & Cie, Paris, France

[21] Appl. No.: 17,578

[22] Filed: Mar. 5, 1979

Related U.S. Application Data

[63] Continuation of Ser. No. 777,290, Mar. 11, 1977, abandoned.

[30] Foreign Application Priority Data

Mar. 11, 1976 [FR] France .................. 76 07002
Mar. 12, 1976 [FR] France .................. 76 07076

[51] Int. Cl.³ .................................. B01D 11/04
[52] U.S. Cl. ........................ 23/293 R; 422/257; 422/259; 422/228; 210/634
[58] Field of Search ............... 210/21, 23 R, 83, 85, 210/97, 253, 257 R, 258, 195 R, 252, 255, 322, 519, 521, 319, 22, 520; 259/95, 96; 417/424; 415/215, 71, 73, 74, 143, 203, 182, 213 C, 206, 207, 208; 137/577; 251/319; 422/227, 228, 230, 231, 257, 258, 259; 23/293 R

[56] References Cited

U.S. PATENT DOCUMENTS

| | | | |
|---|---|---|---|
| 1,970,123 | 8/1934 | Boosey | 210/538 |
| 2,120,786 | 6/1938 | Jordan | 210/8 |
| 2,301,722 | 11/1942 | Vaughn | 415/215 |
| 2,405,158 | 8/1946 | Mensing | 210/511 |
| 3,219,422 | 11/1965 | Ellis | 210/21 |
| 3,300,053 | 1/1967 | Peters | 210/519 |
| 3,615,025 | 10/1971 | Rice et al. | 210/521 |
| 3,744,635 | 7/1973 | Horvath | 210/169 |
| 3,784,464 | 1/1974 | Kaminsky | 208/11 |
| 3,963,624 | 6/1976 | Henderson et al. | 210/521 |

FOREIGN PATENT DOCUMENTS

1117959 6/1968 United Kingdom ............ 210/513
1314124 4/1973 United Kingdom ............ 210/513
1443704 7/1976 United Kingdom ............ 210/21

OTHER PUBLICATIONS

Unit Operations of Chemical Engineering, W. L. McCabe et al, McGraw-Hill Book Co. N.Y., pp. 243-245.
"Design of Large Scale Mixer Settlers," J. B. Lott et al. AIME Centennial Meeting, Mar. 1971.
"Horizontal Mixer-Settler..." F. Roberts et al, Trans. Inst. Chem. Eng., vol. 35, 1957, pp. 6-20.
Chemical Engineers Handbook, Fifth Edition, R. Perry et al, McGraw-Hill Book Co., 1973, pp. 19-4 to 19-6.

*Primary Examiner*—Charles N. Hart
*Assistant Examiner*—David R. Sadowski
*Attorney, Agent, or Firm*—Brumbaugh, Graves, Donohue & Raymond

[57] ABSTRACT

In the illustrative embodiments of the invention disclosed, an installation for mixing and separating two non-miscible liquids includes, inter alia, an improved pump structure for raising the liquid dispersion from the mixing tank to the inlet level to the decanting tank, a low flat chute for conveying the dispersion from the mixing tank to the remote end of the decanting tank, height-controlling means for controlling the level of the interphase within the decanting tank, and provision for recycling the lighter liquid phase to the mixing tank.

13 Claims, 7 Drawing Figures

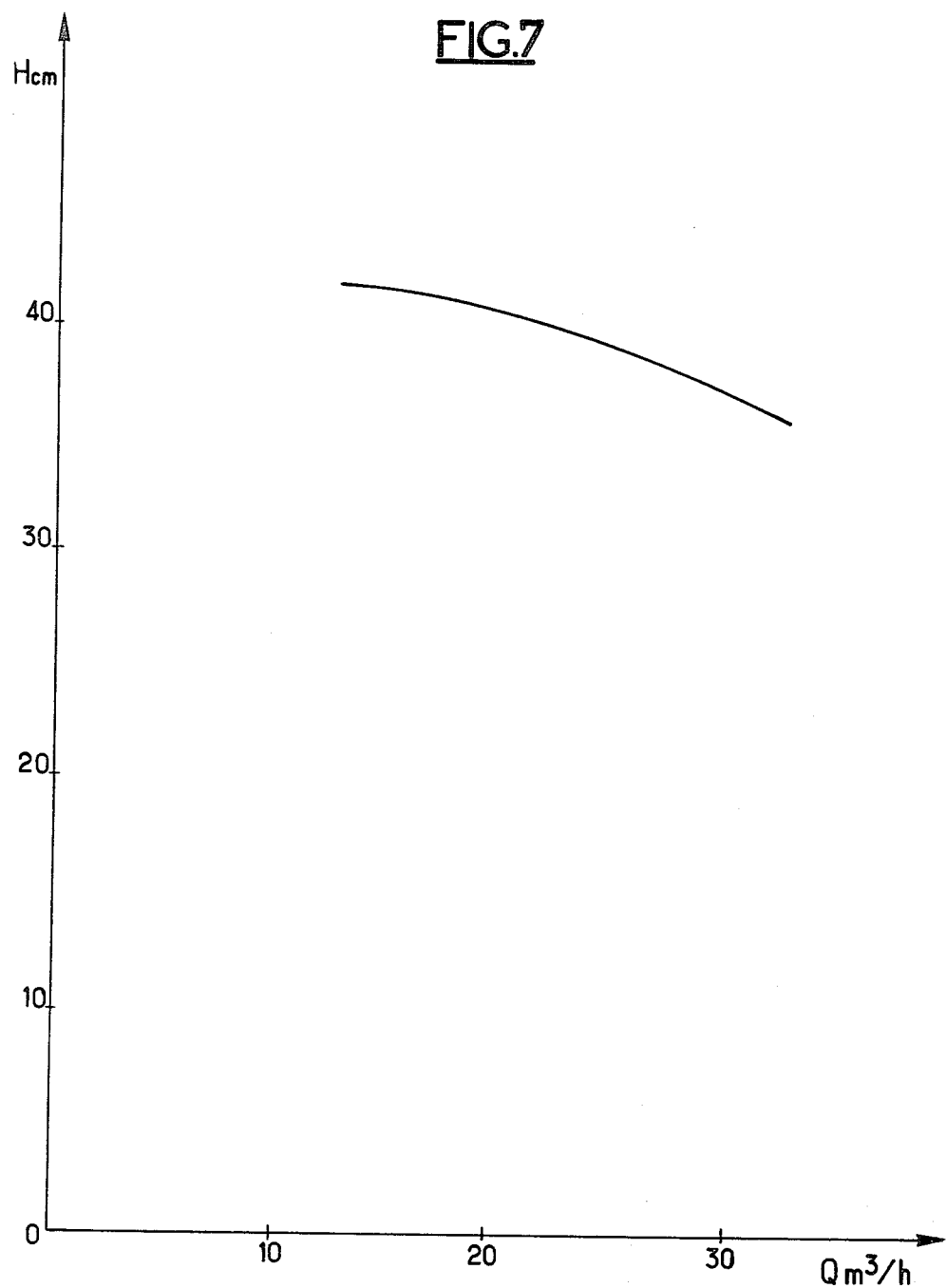

INSTALLATION FOR MIXING AND SEPARATING TWO NON-MISCIBLE LIQUIDS, INTER ALIA FOR LIQUID-LIQUID EXTRACTION

This is a continuation of application Ser. No. 777,290 filed Mar. 11, 1977, now abandoned.

The invention relates to the general method of mixing and separating two non-miscible liquids.

As is known, the method consists in producing a sufficiently fine dispersion of one liquid in the other to facilitate exchange, and then in separating the two non-miscible liquids by decantation. Usually, one of the liquids is an impure solution of a given product, whereas the other liquid is an organic solvent which is either specific to the product in question or acts as a dilution aid for an ion exchanger specific for the product in question. Usually the complete installation comprises an extraction set formed by juxtaposing a number of mixers and decanters in which an impure solution of the product flows in counter-current with the organic liquid, followed by a re-extraction set of identical kind in which the organic liquid flows in counter-current with a pure solution collecting the product, so that the organic liquid can be used in a closed circuit.

Each mixer and decanter in the set mainly comprises a mixer receiving the two liquid products at its base and agitating them to obtain the desired dispersion, followed by a decantation tank in which the mixture flows slowly and gradually separates owing to the non-miscibility of the liquids and the instability of the dispersion. It is clear that, for a given flow rate, the size of each mixer depends on the residence time of the dispersion before moving to the decantation unit, the time depending on the efficiency of the exchanges, which increases with the fineness of the dispersion. On the other hand, the size of each decanter also depends on the residence time of the dispersion through it, the time being dependent on the rate of coalescence of the dispersion, but this rate decreases when the fineness of the dispersion increases. Consequently, there is always an optimum size for the droplets of the dispersion, which determines the size and consequently the minimum cost of the total installation.

The optimum size can be obtained with various kinds of rotary agitators if a suitable rotation speed is adopted. However, the device comprises a number of mixing and settling tanks; in order to supply them with the various liquids, circulation pumps have to be provided. These not only increase the cost of the installation but also introduce shearing, turbulence and additional agitation, with the result that the droplets may not have the optimum size. In many cases, to simplify the installation, use is made of rotary agitators adapted to produce a negative pressure near their axis, thus automatically causing the liquids to flow. However, in the case of such suction agitators, if the diameter and rotation speed are given a suitable value for pumping, they are not often suitable for the dispersion, which usually has an excessive fineness. The result is a considerable increase in the size of the associated decanter.

SUMMARY

One object of the invention is to provide a mixing and separating installation of the previously-mentioned kind which obviates the aforementioned disadvantages, i.e. reduces the total bulk of the installation to a much lower value than the conventional value, and likewise greatly reduces the length of the pipes required and the number of auxiliary components.

According to the invention, each mixer is constructed by disposing a known agitator at the base of the vertical rotary shaft and by disposing a low-turbulence lifting pump at the top part of the same shaft. This avoids introducing additional agitation and also ensures that coalescence begins as a result of the centrifugal force in a conical stream flowing without turbulence.

According to another feature of the invention the flow, after being thus subjected to a first pre-coalescence, is conveyed to the end of the decanter remote from the associated mixer by a low, wide spout where the liquid flows slowly and is subjected to a second pre-coalescence, and a very efficient distributor comprising a grid extending over the entire height and entire width of the decanter is disposed between the decanter and the inlet compartment into which the spout discharges, the grid being made up of parallel strips which are substantially horizontal or preferably slightly inclined in the direction favouring coalescence.

The pump, which can be used in the installation according to the invention or for any other application, has a large delivery and a low lifting height and is of very simple construction and very rugged. It operates at low speed, using little power, and introduces practically no turbulence or shearing into the liquid.

According to the last-mentioned feature, the pump comprises an upwardly flared stationary frusto-conical bowl in combination with a rotor comprising an axial shaft bearing three radial trapezoidal blades, which are preferably curved at their bottom leading edge. The minor base of the truncated cone opens below the lower level of liquid whereas the major bases of the cone has an edge forming an overflow from which the raised liquid flows to the higher level.

BRIEF DESCRIPTION OF THE DRAWINGS

Other features of the invention will be clear from the following description of some embodiments, given by way of example and shown in the accompanying drawing, in which:

FIG. 7 is a graph showing part of the characteristic curve of the pump.

DETAILED DESCRIPTION

Figure 1:
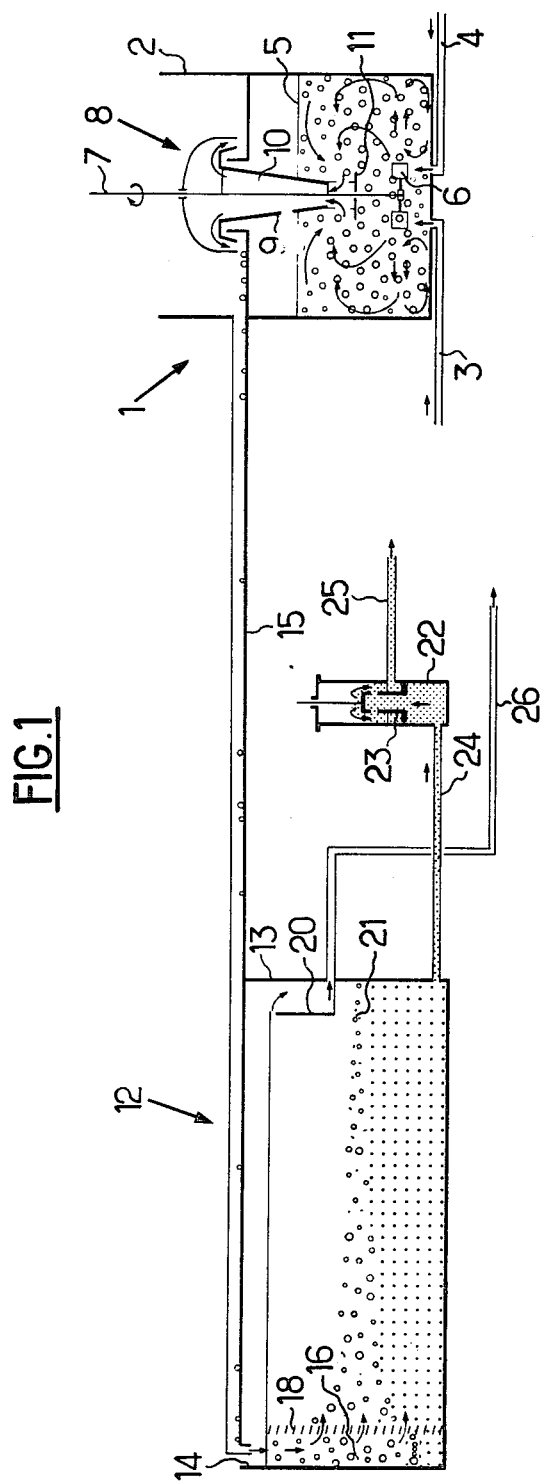
FIG. 1 is a diagrammatic vertical section through a mixing and decantation stage.

A mixer 1, shown on the right of FIG. 1, in conventional manner comprises an axially vertical, cylindrical tank 2, into which two ducts 3, 4 open and supply the aqueous phase and the organic phase respectively. Tank 2 is filled with a mixture of the two liquids up to level 5, and a known agitator 6 rotates at the bottom of the mixture. The structure, dimensions and rotation speed of the agitator are freely chosen to obtain the optimum droplet size in the dispersion of one liquid in the other. Usually the aqueous phase is dispersed in the organic phase, but the opposite may be the case in certain applications.

According to the invention, a cone pump 8 is mounted above agitator 6 and on the same driving shaft 7. Pump 8 mainly comprises a frusto-conical stationary wall 9 in which three radial trapezoidal blades 10 rotate, the blades being mounted on a shaft 7. In order to prevent the turbulence produced from agitator 6 from being directly transmitted to the inlet of pump 8, the pump preferably has a bottom or end portion 11 extending and forming a deflector, whereas the dispersion of the two liquids reaches the base of cone 9 through lateral inlets.

One of the main advantages of the pump is that it operates at low speed, and more particularly can easily be adapted to the cone diameter and angle so as to operate at the rotation speed of shaft 7, which has been chosen only in dependence on agitator 6 to obtain the optimum fineness of the dispersion. Of course, the lifting height is the part of the cone which extends out of the liquid. Another feature of the pump is that its characteristic is very flat and therefore self-regulating, i.e. large variations in the total flow rate of the two liquids arriving at the base of the mixer produce only slight variations in the height of the liquid level 5. Finally, the main feature of the pump is that it induces very little turbulence in the conical stream of liquid, inside which there is an appreciable centrifugal force. Consequently, the pump produces no shearing or additional dispersion of the mixture, on the contrary, the mixture is already subjected to initial coalescence during its rise, i.e. the droplets of the discontinuous phase begin to grow in size. This assures an optimum exchange between the two phases, resulting in predecantation so that the rest of the installation can be correspondingly reduced in size.

The mixture leaving the mixer is conveyed in conventional manner to the inlet of a decanter 12. However, instead of conveying the mixture in conventional manner, directly to that inlet 13 of the associated decanter which is nearest mixer 1, the mixture is conveyed according to the invention to the other end 14 of the decanter, i.e. remote from mixer 1. Furthermore, instead of using a conventional pipe, having a circular section and a reduced diameter in which the liquid flows at considerable speed, use is made according to the invention of a horizontal, wide, low spout 15 having a rectangular cross-section, in which the liquid flows slowly and thus undergoes a second predecantation, the increase in size of the droplets being increased by the thinness of the liquid stream and the slowness of the flow, and also by the length of the spout, due to the aforementioned inversion of the supply.

Decanter 12 is an ordinary rectangular tank which is conventional except that the liquid flows through it in the opposite direction from usual. In order further to improve the decantation, the end compartment 16 into which the flared end 17 of spout 15 opens (FIG. 3) is separated from the rest of the tank by an efficient distributor comprising a grid 18 extending over the entire width and height of the tank. The grid is made up of parallel wall elements which are substantially horizontal or preferably inclined in the direction favouring the coalescence and holding-back of the discontinuous phase, depending on whether it is more or less dense than the continuous phase.

Figure 2:
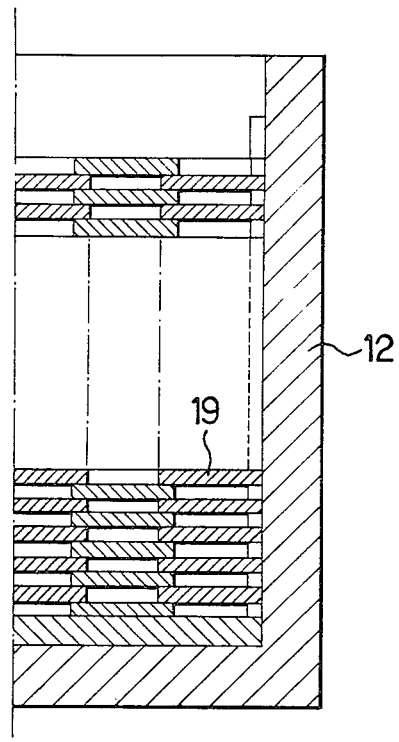
FIG. 2 is a larger-scale partial cross-section of the decanter, at the distribution grid.

FIG. 2 is a detailed view of an embodiment of a grid of the aforementioned kind, which can e.g. comprise a stack of superposed, partly overlapping rectangular wall elements 19, secured together by appropriate means.

The two phases in decanter 12 are progressively separated in conventional manner but with much greater efficiency owing to the two predecantations which have occurred in pump 8 and spout 15 and have substantially increased the size of the droplets of the discontinuous phase. Owing to the aforementioned set of features, the residence time in decanter 12, which determines its volume, can be about 3 times as small as the normal time, e.g. 5 minutes instead of 15 minutes, so that the size of the decanter can be proportionally reduced, thus greatly reducing the cost of the installation, the building containing it, and auxiliary devices such as fire-preventing means and the like.

At end 13 of the decanter the top or less dense phase, usually the organic phase, flows at a constant level over a conventional threshold 20. In order automatically to adjust the height of the interphase 21, use can be made of a device shown in the centre of FIG. 1, comprising a cylinder 22 in which a piston 23 moves in sealing-tight manner and is prolonged by a central chimney forming an overflow at its top. A duct 24 from the base of the decanter opens at the base of cylinder 22, whereas a duct 25 opens into cylinder 22 above piston 23 but below the overflow in all positions of the piston. The height of the piston can be adjusted by a suitable means so as automatically to adjust the hydrostatic pressure in duct 24, thus determining the height of the interphase.

Figure 3:
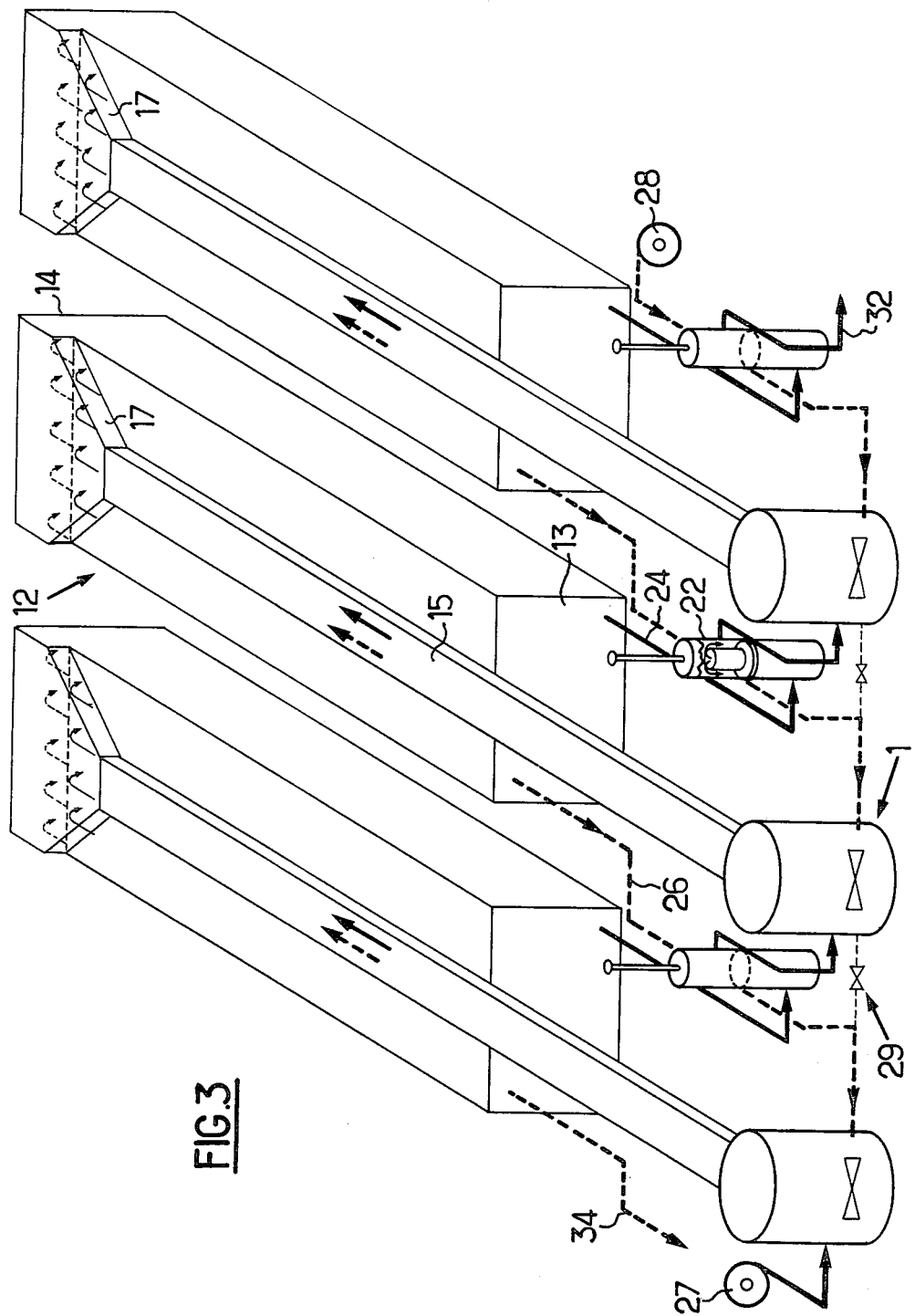
FIG. 3 is a diagrammatic perspective view showing a number of successive stages incorporated in a single extraction or re-extraction set.

Mixing and decanting units such as shown in FIG. 1 are used in the form of a set, usually of four elements. FIG. 3 is a diagram of part of such a set, the continuous lines denoting ducts conveying the aqueous phase and the broken lines indicating ducts conveying the organic phase, the arrows indicating the direction of flow. More particularly, mixer 1, disposed at the centre of the group in FIG. 3, is connected via spout 15 to the oppositely-disposed decanter, and duct 24 coming from decanter 12 conveys the aqueous phase via cylinder 22 to the mixer disposed at the right of the drawing, whereas pipe 26 from decanter 12 conveys the organic phase to the mixer disposed at the left. The same feature is repeated in each component of the set, so that the aqueous phase supplied by pump 27 flows through the entire set from left to right, whereas the organic phase supplied by pump 28 flows through the same set from right to left, i.e. in counter-current with the aqueous phase.

As can be seen, the invention can greatly reduce the size of all the pipes in the set, since the pipes all come from the decanter surface 13 near the mixer, and not from the opposite surface, as in the conventional manner. More particularly if, as is frequently the case, it is required to recycle the organic phase, it is sufficient to provide a short connection 29 (shown with the associated regulating valve in FIG. 3) between pipe 26 coming from decanter 12 and the base of the associated mixer 1.

Figure 4:
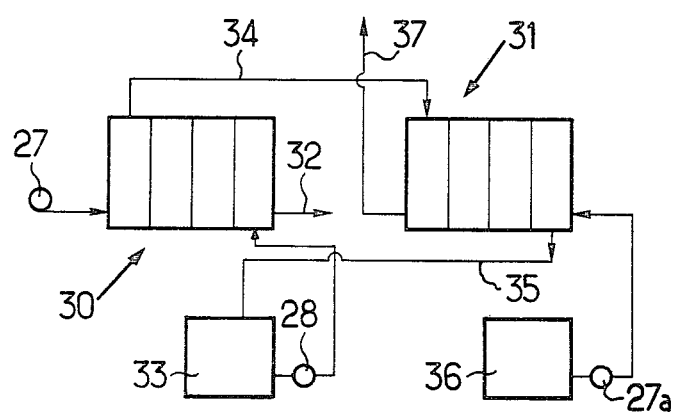
FIG. 4 is a general diagram of the complete installation.

By way of example, FIG. 4 is a general diagram of an installation comprising an extraction set 30 and a re-extraction set 31, each set comprising e.g. four stages of the kind shown in FIG. 1. In each set, the stages are mounted in series and in counter-current as shown in FIG. 3. More particularly, the aqueous phase containing the product for extraction arrives at 27 and leaves at 32 whereas the organic phase coming from reservoir 33 is introduced at 28 and leaves via a pipe 34 conveying it directly to the inlet of the re-extraction set 31, from which it emerges through a pipe 35 which conveys it back to reservoir 33, so that the organic phase operates in a closed circuit. In the re-extraction set, another aqueous phase coming from reservoir 36 is conveyed by a pump 27a to the re-extraction set 31, where it flows in counter-current from the organic phase and comes out at 37.

By way of example, the first aqueous phase can comprise an impure solution containing inter alia a given metal ion, the organic phase can be kerosene containing in solution an ion exchanger specific for the ion which is to be extracted, and the second aqueous phase can be a solution of an appropriate salt, usually a sodium chloride brine, producing a reverse ion exchange in the ion exchanger. The final product is a pure solution of the desired metal ion at 37.

Figure 5:
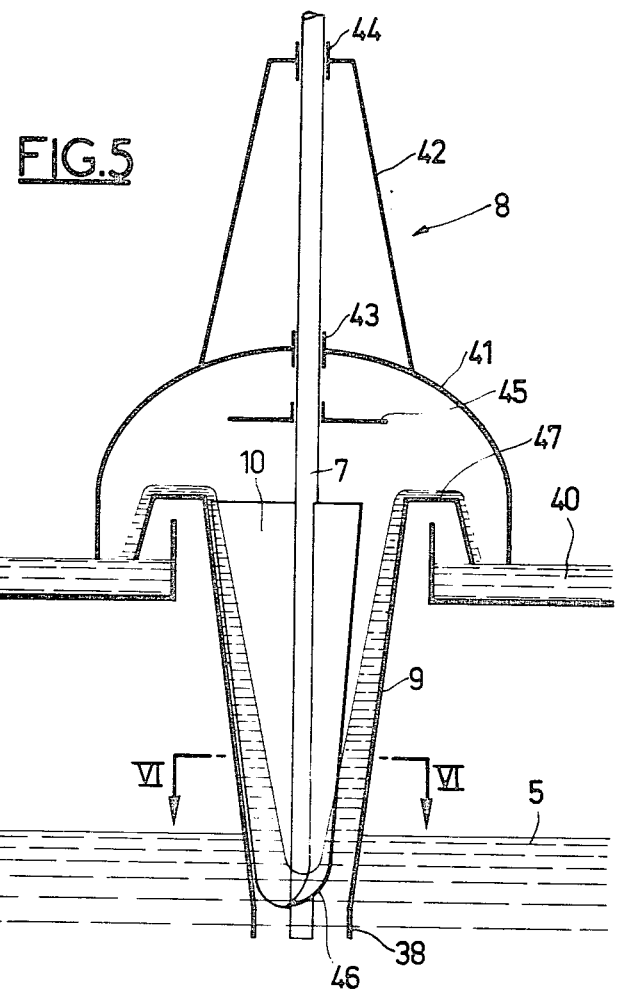
FIG. 5 is an axial vertical section of a pump according to the invention.
Figure 6:
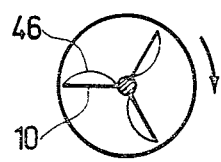
FIG. 6 is a sectional along VI—VI of FIG. 5.

The pump 8 is shown in greater detail in FIGS. 5-7.

As FIG. 5 shows, pump 8 comprises a stator formed by a frusto-conical, axially vertical, upwardly flared wall 9. A rotor is mounted in the stator and comprises a vertical shaft 7 disposed coaxially with the stator and bearing three substantially trapezoidal blades 10 extending from shaft 7 to wall 9, leaving a small clearance in between.

The bottom end 38 of wall 9 opens below the equilibrium surface 5 of the liquid to be raised, and the top edge 47 of wall 9 forms a circular overflow for discharging the liquid, which flows naturally to the top level 40, a threshold being provided to prevent flow in the reverse direction when the pump stops. Preferably the assembly is covered with a protective hood 41 preventing any spraying of liquid. Two bearings 43, 44 holding the vertical shaft 7 can be disposed on hood 41 and on a holder 42 secured on the hood. A rotary deflector 45 may, if required, be disposed on shaft 7 below the bottom bearing 43 to protect it against sprayed liquid. Preferably, the bottom leading edge 46 of blades 10 is curved to the front with respect to the direction of rotation, as shown in FIGS. 5 and 6.

When shaft 7 is rotated by a motor (not shown), with or without a reduction gear, the liquid above level 5 in bowl 9 is rotated, thus becoming hollowed at its centre and rising along walls 1 to the periphery. When the rotation speed becomes sufficient, the liquid rising up the walls reaches the top edge 47 and the pump begins to deliver. Normally, shaft 7 must be driven at a speed above this minimum speed, which mainly depends on the dimensions of the device, but the minimum speed is always relatively small, i.e. a few tens to few hundreds of r.p.m.

The three blades, which are distributed at regular intervals around shaft 7 and rotate in a liquid, have a self-centring effect and do not introduce any bending moment or vibration in shaft 7, which is particularly important in the case where the shaft is mounted in cantilever manner with two upper bearings 43 and 44, as in the example shown.

In a variant, the bottom end 38 of the truncated cone 9 has a cylindrical or conical prolongation closed by an end member, the wall of the prolongation having radial or tangential inlets for liquid, and the end member may if required comprise a bearing for shaft 7.

The resulting pump can be used not only in the installation in FIGS. 1-4 but also for other applications. Its flexibility is a noteworthy feature. If the rotation conditions are fixed as previously described and the characteristic curve is drawn, showing the lifting height in dependence on flow rate as in FIG. 7, it can be seen that the curve is relatively flat. In practice, there is frequently an imposed flow which does not overflow into the tank 2 at the lower level 5 but which has to be raised to the upper level 40. In this case it is clear from the curve in FIG. 7 that if the flow rate abruptly decreases e.g. by half, the lifting height varies only by approx. 10%, i.e. the bottom level 5 is reduced by only a small amount. This property is particularly useful in a complete installation according to the invention, comprising a number of similar pumps transferring liquids between a number of tubes. Owing to the great flexibility, there is no adjustment problem during variations in conditions.

In addition to the last-mentioned property, the pump according to the invention is clearly of an extremely simple, rugged construction and of reduced size, in view of the very high flow rate which can occur over the entire periphery of threshold 47. On the other hand, the pump operates at low speed and uses little energy and is highly efficient, in view of the low turbulence of the liquid stream. The flow is almost laminar from the base to the top of the cone. In addition, the almost laminar motion is subjected to an appreciable, constant centrifugal force, which may be useful in certain cases, inter alia when the conveyed liquid contains solid particles in suspension or a dispersion of a second liquid which is not miscible in the first and which has to be separated therefrom.

We claim:

1. In an installation including at least one set of cooperating mixing and decanting apparatus for mixing and separating two non-miscible liquids, each set of apparatus including a mixing tank supplied separately in a lower part thereof with the two liquids and filled therewith to a first level, an agitator located in the lower part of the mixing tank below said first level and mounted on a vertically extending shaft for rotation therein to produce a dispersed mixture of the liquids, a rotary pump located in an upper part of the mixing tank for raising the mixture from the first, lower level to a second, higher level, and a decanting tank for receiving the mixture from the second, higher level of the mixing tank for parallel horizontal flow therein at a free level intermediate in height to said first and second levels, the improvement wherein said pump comprises:

a stator defining a frustoconical, upwardly flared wall coaxial with and surrounding said vertically extending shaft and extending from below said first, lower level to above said second, higher level;

a rotor carried by said vertically extending shaft for rotation within said stator, said rotor having at least three regularly-arranged blades each extending radially from said shaft to an outer edge close to the flared wall of the stator; and fixed inlet means located vertically between the agitator and the rotor for admitting liquid into the lower end of the pump, said inlet means constraining the mixture to flow into the pump in a direction generally perpendicular to said vertically extending shaft, thereby reducing the turbulence of the mixture within the pump.

2. The installation of claim 1, wherein said inlet means comprises a downward extension of said stator, the wall of said extension being formed with lateral apertures through which the liquid mixture enters the pump.

3. The installation of claim 1, wherein the leading edge of the lower end of each of said generally trapezoidal blades is curved towards the direction of rotation of the rotor.

4. The installation of claim 1, wherein said pump further comprises:
   a generally circular spray deflector secured to said shaft at a level above said second level; and
   a protective hood covering the entire upper end of the pump for preventing the liquid mixture from spraying therefrom.

5. The installation of claim 1, wherein the decanting tank includes an upper outlet for the lighter of the two liquids and a lower outlet for the denser of the two liquids and wherein the improvement further comprises:
   means coupled to said lower liquid outlet for controlling the height within the decanting tank of the interphase between the two liquids, said height-controlling means including a vertically extending cylinder having an inlet in a lower part thereof coupled to said lower liquid outlet and an outlet in an upper part thereof, a generally tubular piston received in said cylinder for vertical adjustment therein, the lower part of said piston sealingly engaging the wall of said cylinder at a level, at all positions of adjustment of the piston within the cylinder, above the fluid inlet to the cylinder but below the fluid outlet from the cylinder, and the upper part of said cylinder defining an overflow for the liquid at a level, at all positions of adjustment of the piston within the cylinder, above the fluid outlet from said cylinder.

6. The installation of claim 1, wherein the improvement further comprises:
   means for conveying the dispersion from said higher, second level of the pump to that end of the decanting tank remote from the mixing tank for flow therein in the direction towards the mixing tank; and
   separate outlets in the decanting tank at the end thereof adjacent said mixing tank for separately withdrawing the two liquids.

7. The installation of claim 6, wherein said conveying means comprises:
   an elongated, substantially horizontal conduit of generally rectangular transverse cross section; and
   liquid distribution means for receiving the mixture from said conduit at said remote end of the decanting tank and for distributing it across the width and height of the decanting tank so as to promote coalescence therein.

8. The installation of claim 7, wherein the width of said conduit is substantially greater than its height, whereby the conduit comprises a wide, low spout for conveying the liquid mixture to the remote end of the decanting tank in a manner such that coalescence can occur in said conduit.

9. The installation according to claim 6, wherein the installation includes a plurality of said sets of cooperating mixing and decanting apparatus, said sets being connected in series for counter-current flow therethrough of the two liquids, and wherein the improvement further comprises:
   each set except the first set in the series includes means for recycling the lighter liquid from the decanting tank of said each set to the mixing tank of said each set, said recycling means including flow control means for enabling said recycling interposed between the lighter liquid outlet from the decanting tank of said each set and the mixing tank of the next set in the series in the downstream direction of flow of the lighter liquid through said series.

10. A method of mixing and separating two non-miscible liquids, comprising the steps of:
    (a) separately supplying a tank with the two liquids to fill said tank to a first, lower level;
    (b) mixing said liquids in the tank to provide a dispersed mixture thereof;
    (c) pumping the liquid mixture with low turbulence from said first, lower level to a second, upper level, said pumping step including the step of restraining the turbulence of the mixture at the inlet to the pump by constraining the mixture to flow into the pump in a generally horizontal direction;
    (d) conveying the liquid mixture from said upper level along a generally horizontal, elongated path to the inlet of a decanting tank, said inlet being located at the end of said decanting tank remote from said mixing tank;
    (e) decanting said liquid mixture in the decanting tank, while the mixture flows towards said mixing tank at a free level intermediate in height to said first and second levels; and
    (f) separating said two liquids by separately withdrawing said liquids from the decanting tank at the end thereof adjacent said mixing tank.

11. The method of claim 10 further comprising the steps of:
    (g) repeating steps (a) through (f) in a further mixing tank and associated pump and decanting tank coupled in series to the first mentioned mixing tank and associated pump and decanting tank; and
    (h) recycling at least part of the lighter liquid drawn off from the first-mentioned decanting tank to the mixing tank associated with said first-mentioned decanting tank.

12. In an installation for mixing and separating two non-miscible liquids, comprising a mixer and a continuous decanter at parallel horizontal flow having a free level, the mixer comprising a tank supplied with both liquids separately and having a lower level lower than said free level in said decanter and an upper level above a horizontal intermediate wall, said upper level being higher than said free level in said decanter, an agitator being mounted on a vertical rotary shaft and rotating in the tank under said lower level, with pumping means for raising the mixture from said lower level to said upper level, the decanter having an upper outlet for the lighter of the two liquids and a lower outlet for the denser of the two liquids, the improvement wherein:
    said pumping means comprises a stator and a rotor, said stator being a frusto-conical upwardly flared wall coaxial with said shaft and extending from a base level lower than said lower level to a top level higher than said upper level through said intermediate wall, and said rotor having at least three substantially trapezoidal blades each extending substantially from said base level to said top level and from said shaft to an outer edge close to the inner surface of said stator, said rotor being keyed to the same shaft as the agitator and said agitator being located below said base level; and
    means coupled to the lower liquid outlet from the decanter for controlling the height within the decanter of the interphase between the two liquids, said height-controlling means including a vertically extending cylinder having an inlet in a lower part thereof coupled to said lower liquid outlet and an outlet in an upper part thereof, a generally tubular piston received in said cylinder for vertical adjustment therein, the lower part of said piston sealingly engaging the wall of said cylinder at a level, at all positions of adjustment of the piston within the cylinder, above the fluid inlet to the cylinder but below the fluid outlet from the cylinder, and the upper part of said cylinder defining an overflow for the liquid at a level, at all positions of adjustment of the piston within the cylinder, above the fluid outlet from said cylinder.

13. In an installation including at least one set cooperating mixing and decanting apparatus for mixing and separating two non-miscible liquids, each set of apparatus comprising a mixer and a continuous decanter at parallel horizontal flow having a free level, the mixer comprising a tank supplied with both liquids separately and having a lower level lower than said free level in said decanter and an upper level above a horizontal intermediate wall, said upper level being higher than said free level in said decanter, an agitator being mounted on a vertical rotary shaft and rotating in the tank under said lower level, with pumping means for raising the mixture from said lower level to said upper level, the improvement wherein:

said pumping means comprises a stator and a rotor, said stator being a frusto-conical upwardly flared wall coaxial with said shaft and extending from a base level lower than said lower level to a top level higher than said upper level through said intermediate wall, and said rotor having at least three substantially trapezoidal blades each extending substantially from said base level to said top level and from said shaft to an outer edge close to the inner surface of said stator, said rotor being keyed to the same shaft as the agitator and said agitator being located below said base level;

means defining a substantially horizontal wide low spout for conveying the pre-decanted mixture leaving the pump to the decanter, said spout extending to that end of the decanter remote from the mixer, so that said horizontal flow in the decanter is moving in a direction towards the mixer; and a plurality of said sets of mixing and decanting apparatus are connected in series such that the two liquids flow in counter-current in the installation, each said set except the first including a recycling connection with control means for the lighter liquid disposed between the mixing tank of said set and the return pipe connecting the outlet of the lighter liquid of the decanter of said set to the mixing tank of the preceeding set located downstream in respect to the lighter liquid and upstream in respect to the denser liquid.

* * * * *

UNITED STATES PATENT AND TRADEMARK OFFICE
CERTIFICATE OF CORRECTION

PATENT NO. : 4,235,602
DATED : November 25, 1980
INVENTOR(S) : Maurice Meyer and Heinrich Stucki It is certified that error appears in the above—identified patent and that said Letters Patent is hereby corrected as shown below:

Column 1, line 7, insert thereafter as a heading
--BACKGROUND
  Field of the Invention--;
Column 1, line 9, insert thereafter as a heading --The Prior Art--;
Column 2, line 54, "sectional" should read --section--;
Column 5, line 49, after "to" insert --a--;
Column 7, line 28, "cylinder" should read --piston--; and
Column 9, line 10, "cylinder" should read --piston--.

Signed and Sealed this

Sixteenth Day of June 1981

[SEAL]

Attest:

RENE D. TEGTMEYER

*Attesting Officer*     *Acting Commissioner of Patents and Trademarks*